(12) United States Patent
Webber

(10) Patent No.: US 11,435,011 B2
(45) Date of Patent: Sep. 6, 2022

(54) HOSE POSITIONER

(71) Applicant: STUT NO. 1 PTY LTD, Sumner Park (AU)

(72) Inventor: Richard Webber, Sumner Park (AU)

(73) Assignee: STUT NO. 1 PTY LTD, Sumner Park (AU)

( * ) Notice: Subject to any disclaimer, the term of this patent is extended or adjusted under 35 U.S.C. 154(b) by 0 days.

(21) Appl. No.: 17/604,923

(22) PCT Filed: Jun. 24, 2019

(86) PCT No.: PCT/AU2019/050647
§ 371 (c)(1),
(2) Date: Oct. 19, 2021

(87) PCT Pub. No.: WO2020/257841
PCT Pub. Date: Dec. 30, 2020

(65) Prior Publication Data
US 2022/0090703 A1    Mar. 24, 2022

(51) Int. Cl.
| *F16L 3/10* | (2006.01) |
| *F16B 2/08* | (2006.01) |
| *F16B 7/04* | (2006.01) |
| *F16L 3/22* | (2006.01) |
| *F16L 3/237* | (2006.01) |

(52) U.S. Cl.
CPC ............ *F16L 3/1033* (2013.01); *F16B 2/08* (2013.01); *F16B 7/0493* (2013.01); *F16L 3/1058* (2013.01); *F16L 3/221* (2013.01); *F16L 3/237* (2013.01)

(58) Field of Classification Search
CPC ....... F16L 3/1033; F16L 3/1058; F16L 3/221; F16L 3/233; F16L 3/237; F16L 3/10; F16L 3/02; F16L 3/14; F16B 2/08; F16B 7/0493
See application file for complete search history.

(56) References Cited

U.S. PATENT DOCUMENTS

| 3,154,281 | A | * | 10/1964 | Frank | ..................... H05K 3/301 248/220.31 |
| 3,286,963 | A | * | 11/1966 | Bergman | .................. F16L 3/10 24/457 |
| 3,370,815 | A | * | 2/1968 | Opperthauser | ....... F16L 55/035 248/74.2 |
| 3,944,177 | A | * | 3/1976 | Yoda | ..................... F16L 3/1203 248/74.2 |
| 5,474,268 | A | * | 12/1995 | Yu | ......................... F16L 33/035 248/62 |

(Continued)

FOREIGN PATENT DOCUMENTS

| CN | 208431459 U | 1/2019 |
| EP | 0780616 A1 | 6/1997 |

OTHER PUBLICATIONS

International Report on Patentability issued in PCT/AU2019/050647 dated Jan. 18, 2021.

*Primary Examiner* — Anita M King
(74) *Attorney, Agent, or Firm* — Snell & Wilmer L.L.P.

(57) ABSTRACT

A hose positioner having an body with a passageway extending therethrough. The body is adapted to receive a hose into the passageway. The hose positioner also includes a connecting member extending from the elongate body which is adapted to be releasably retained with a connector.

18 Claims, 9 Drawing Sheets

(56) References Cited

U.S. PATENT DOCUMENTS

| | | | | |
|---|---|---|---|---|
| 6,682,025 B2* | 1/2004 | Turner | ............... | F16L 3/13 |
| | | | | 248/65 |
| 7,608,782 B2* | 10/2009 | Hill | ............... | H01R 4/646 |
| | | | | 248/74.2 |
| 7,758,217 B2* | 7/2010 | Hsu | ............... | G02F 1/133608 |
| | | | | 362/225 |
| 8,356,778 B2* | 1/2013 | Birli | ............... | F16L 3/237 |
| | | | | 248/65 |
| 9,482,369 B2* | 11/2016 | Sampson | ............... | F16L 3/237 |
| 2005/0017133 A1 | 1/2005 | Wochnick | | |
| 2006/0249634 A1 | 11/2006 | Van Walraven | | |
| 2014/0014787 A1* | 1/2014 | Chen | ............... | H02G 3/32 |
| | | | | 248/74.1 |
| 2015/0159777 A1 | 6/2015 | White et al. | | |

\* cited by examiner

HOSE POSITIONER

CROSS-REFERENCE TO RELATED APPLICATIONS

This application is a national stage application of PCT/AU2019/050647, filed on Jun. 24, 2019, entitled "HOSE POSITIONER," which is hereby incorporated by reference in its entirety for all purposes.

FIELD OF THE INVENTION

The invention relates to a hose positioner. In particular, the invention relates, but is not necessarily limited, to a hose positioner adapted to space one or more hoses relative to each other or another object.

BACKGROUND

Any references to methods, apparatus or documents of the prior art are not to be taken as constituting any evidence or admission that they formed, or form, part of the common general knowledge.

Pipe, hose and tube bundles are known for the use of transferring liquids and gases from one location to another.

In an example, hydraulic hose and tube bundles, often used in mining and oil well drilling applications, are typically used to transport hydraulic fluid to control equipment and machinery.

The hydraulic hoses, and hoses in general, are typically flexible, vary in diameter and can extend for up to several metres in length. Over time the hoses can be prone to high levels of friction between surrounding surfaces or components and other hoses which eventually degrade the hose to the point that it must be replaced.

In some instances, the hoses may be attached to a support structure in a bundle to minimise movement and vibrations and secure the hoses. However, these solutions do not address the needs of the industry owing to the fragility and excessive movement of the hoses within the bundle.

OBJECT OF THE INVENTION

It is an aim of this invention to provide a hose positioner which overcomes or ameliorates one or more of the disadvantages or problems described above, or which at least provides a useful commercial alternative.

Other preferred objects of the present invention will become apparent from the following description.

SUMMARY OF THE INVENTION

In one form, the invention resides in a hose positioner comprising:
a body having a passageway therethrough, the elongate body adapted to receive a hose into the passageway; and
a connecting arrangement having a connecting member extending from the elongate body, the connecting member adapted to be releasably retained by a connector for retaining the hose positioner in a spaced apart relationship from an object connected to the connector.

Preferably, the connecting arrangement is adapted to be releasably retained within a connector for receiving and retaining two or more hose positioners in a spaced apart relationship.

Preferably, the object connected to the connector is a mounting structure or support structure connected on an opposite side of the connector to the hose positioner.

Preferably, the body is an elongate body.

Preferably, the elongate body is substantially arch-shaped. Preferably, the arch-shaped elongate body comprises a flat base and an arch portion extending from one end of the flat base to a diametrically opposed end of the flat base.

Preferably, the passageway is substantially cylindrical. Preferably, the passageway is an open-ended passageway extending longitudinally through the elongate body.

Preferably, the connecting member comprises a shaft and a head. Preferably, the shaft comprises a cylindrical portion and the head comprises a frustoconical portion. Preferably, an end of the cylindrical portion is attached to the body of the hose positioner. Preferably, an opposing end of the cylindrical portion is attached to the frustoconical portion. Preferably, a diameter of a base of the frustoconical portion is greater than a diameter of the cylindrical portion. Suitably, the shaft of the connecting member may be any shape. For example, in some embodiments, the shaft may be square or rectangular to prevent rotation of the hose positioner. Similarly, the head of the connecting member may be any shape that is reciprocal to a shape of an opening of a connector. For example, the head of the connecting member may be square to be received within a square shaped opening of a connector. In some embodiments, the shaft comprises a truncated cylinder portion or a semi-circular prism portion or a half cylinder portion. Preferably, the shaft comprises two or more sides or edges (i.e. the shaft is not circular or cylindrical). In some embodiments, the shaft comprises at least one flat side or edge.

Preferably, the elongate body comprises an elongate opening extending longitudinally along a length of the elongate body. Preferably, the opening in the elongate body and the passageway are connected. Preferably, the opening divides the arch portion into two arced walls, each arced wall extending from an end of the flat base.

Preferably, the elongate body comprises one or more cutout regions or recessed regions extending laterally around a perimeter of the elongate body. Preferably, the elongate body comprises at least two cutout regions or recessed regions. Preferably, each of the cutout regions or recessed regions is adapted to receive a releasable, and suitably adjustable, fastener. Preferably, the fastener is a zip tie. Preferably, in use, the fastener is adjusted to bias the two arced walls together or towards each other thereby reducing a width of the opening extending along the elongate body. Preferably, the fastener at least maintains the two arced walls in a spaced apart relationship having a minimum width therebetween In another form, the invention resides in a connector having a connecting arrangement adapted to receive and releasably retain at least one hose positioner in a spaced apart relationship from an object connected to the connector.

Preferably, the connector is adapted to connect at least two hose positioners in a spaced apart relationship. Preferably, the connector comprises a cylindrical passageway extending longitudinally through the substantially cylindrical body. Preferably, the connector comprises one or more openings to receive a connecting arrangement or connecting member of a hose positioner. Preferably, each opening is complementary to or reciprocally shaped to receive a head of a connecting member of a hose a positioner. Preferably, the connector comprises two circular openings located at diametrically opposed ends of the substantially cylindrical body. Preferably, the two circular openings are located at opposing ends of the cylindrical passageway. In some embodiments, the connector comprises one or more openings having a truncated circle shape. In some embodiments, the connector comprises one or more square or rectangular openings. Preferably, the opening comprises two or more sides or edges (i.e. the opening is not circular).

Preferably, the connector is adapted to receive and retain a connecting member of a hose positioner via an interference fit. Preferably, each opening is adapted to receive and retain a connecting member of a hose positioner.

Preferably, the connector comprises a body. Preferably, the body is a substantially cylindrical body. However, the body can conceivably be any shape.

In another form, the invention resides in a connector adapted to receive and releasably retain at least one hose positioner in a spaced apart relationship from an object connected to the connector, the connector comprising:
 a body;
 a passageway extending into the body;
 a connecting arrangement comprising at least one opening, each opening being connected to the passageway,
 wherein the passageway is adapted to receive and retain a connecting member or a connecting arrangement of a hose positioner within each of the openings.

Preferably, the passageway is open at a first end and closed at a second end.

In another form, the invention resides in a connector adapted to connect at least two hose positioners in a spaced apart relationship, the connector comprising:
 a body;
 a passageway extending through the body; and
 a connecting arrangement comprising at least two openings, each opening located at an end of the passageway,
 wherein the passageway is adapted to receive and retain a connecting member or a connecting arrangement of a hose positioner within each of the openings.

In another form, the invention resides in a hose positioner assembly comprising:
 a hose positioner having a connecting arrangement; and
 a connector having a connecting arrangement reciprocal to the connecting arrangement of the hose positioner, the connecting arrangement adapted to connect the hose positioner to the connector.

In another form, the invention resides in a hose positioner assembly comprising:
 at least two hose positioners, each hose positioner having a connecting arrangement; and
 at least one connector adapted to connect the at least two hose positioners in a spaced apart relationship, each connector having a connecting arrangement reciprocal to the connecting arrangement of the hose positioner.

In another form, the invention resides in a hose positioner assembly comprising:
 a hose positioner having a connecting arrangement; and
 a connector having a connecting arrangement reciprocal to the connecting arrangement of the hose positioner, the connecting arrangement adapted to connect the hose positioner to the connector,
 wherein the connecting arrangement of the hose positioner is received through the connecting arrangement of the connector.

In another form, the invention resides in a hose positioner assembly comprising:
 at least two hose positioners, each hose positioner having a connecting arrangement; and
 a connector connecting the at least two hose positioners in a spaced apart relationship, the connector having a connecting arrangement reciprocal to the connecting arrangements of each of the hose positioners,
 wherein the connecting arrangement of each hose positioner is received through the connecting arrangement of the connector.

Preferably, in use, a longitudinal axis extending along the passageway of the body of the hose positioner is perpendicular to a longitudinal axis extending through the connector.

Preferably, the connecting arrangement of the connector comprises one or more openings reciprocal to the connecting arrangement of a hose positioner, each of the openings formed in the body and connected to the passageway of the connector. Preferably, the connecting arrangement comprises two or more frustoconical openings formed in the body and connected to the passageway. Preferably, the openings are in fluid communication via the passageway.

Preferably, an interior space within the body of the connector is defined by an interior wall of the connector. Preferably, the interior wall and opening of the connector form a lip that reciprocally engages the connecting member of the hose positioner.

Preferably, a diameter of the connector is less than a diameter of the flat base of the arch-shaped elongate body. Advantageously, the greater diameter of the flat base reduces the chances that the connecting member of the hose positioner will be dislodged from the connector.

Preferably, when connected, the connector and hose positioner are rotatable. Preferably, when connected, the hose positioner is fixed or is not rotatable relative to the connector.

Preferably, the connector is integrally formed. Alternatively, the connector comprises a two-piece assembly.

In another form, the invention resides in a method for retaining a hose, the method comprising the steps of:
 locating a hose in a hose positioner, the hose positioner having a connecting arrangement; and
 connecting the hose positioner to a connector, the connector having a connecting arrangement reciprocal to the connecting arrangement of the hose positioner, wherein the connector holds the hose positioner in a spaced apart relationship relative to the connector.

In another form, the invention resides in a method for retaining and spacing two or more hoses, the method comprising the steps of:
 locating a first hose in a first hose positioner;
 locating a second hose in a second hose positioner;
 connecting the first hose positioner to a connector; and
 connecting the second hose positioner to the connector, wherein the connector holds the first hose positioner in a spaced apart relationship to the second hose positioner.

Further features and advantages of the present invention will become apparent from the following detailed description

BRIEF DESCRIPTION OF THE DRAWINGS

By way of example only, preferred embodiments of the invention will be described more fully hereinafter with reference to the accompanying figures, wherein.

DETAILED DESCRIPTION OF THE PREFERRED EMBODIMENT

The present invention generally relates to a hose positioner and hose positioner assembly for securing and spacing a hose located within a hose positioner from an adjacent or proximally located hose also located within a hose positioner to prevent hoses from rubbing and wearing against each other, or retain the hoses in a spaced apart relationship with an object, such as a support structure on a crane, for example.

Figure 1:
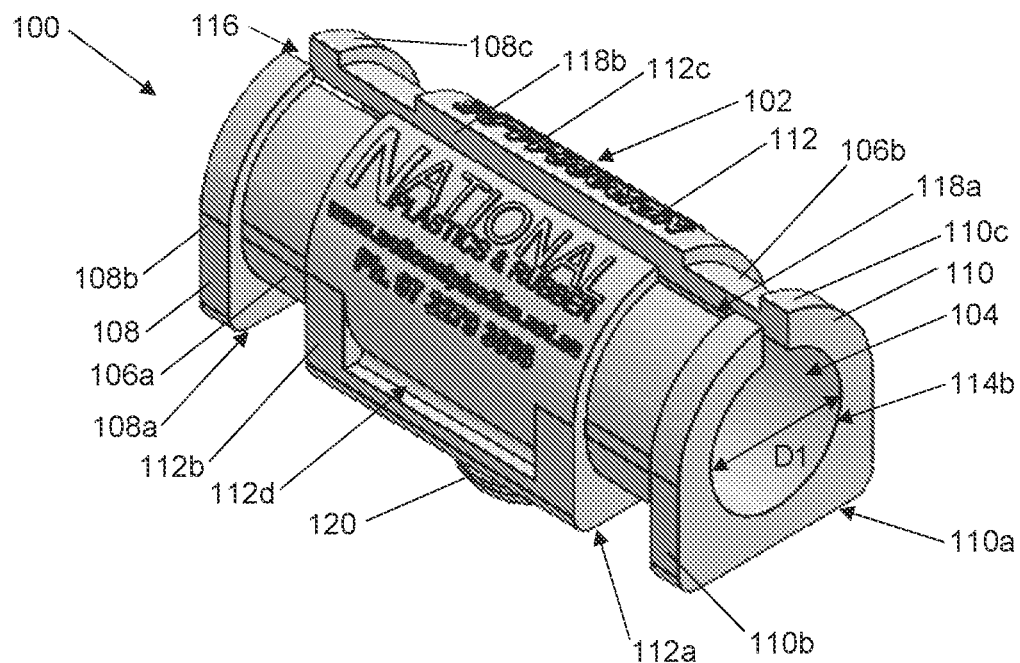
FIG. 1 illustrates a perspective view of a hose positioner according to an embodiment of the present invention.

With reference to FIG. 1, there is shown a hose positioner 100, particularly suitable for hydraulic hoses but useful with any type of hose or cable, for individually securing and spacing a hose of a bundle of hoses.

The hose positioner 100 has a body in the form of an elongate body 102 adapted to receive a hose (not shown). The elongate body 102 is substantially arch shaped having an open-ended cylindrical passageway 104 extending longitudinally therethrough. The diameter D1 of the passageway 104 can be any size but is preferably sized between 20 mm and 80 mm to receive hoses having diameters of 19 mm to 70 mm. In the illustrated embodiment the diameter D1 of the passageway 104 is approximately 20.5 mm.

Disposed along the length of the elongate body 102, adjacent the ends of the elongate body 102 are two cutout or recessed regions forming substantially cylindrical portions 106a, 106b. These two recessed cylindrical portions 106a, 106b define three arch portions of the elongate body 102: two end arch portions 108, 110 and a middle arch portion 112.

Each end arch portion 108, 110 surrounds and defines one of the cylindrical openings 114a, 114b at the ends of the passageway 104 of the elongate body 102. Each arch portion 108, 110, 112 mentioned above includes a flat base 108a, 110a, 112a and two arced walls 108b, 108c, 110b, 110c, 112b, 112c forming an arch portion respectively extending from one end of the flat base 108a, 110a, 112a to the distally located end of the flat base 108a, 110a, 112a.

Figure 3:
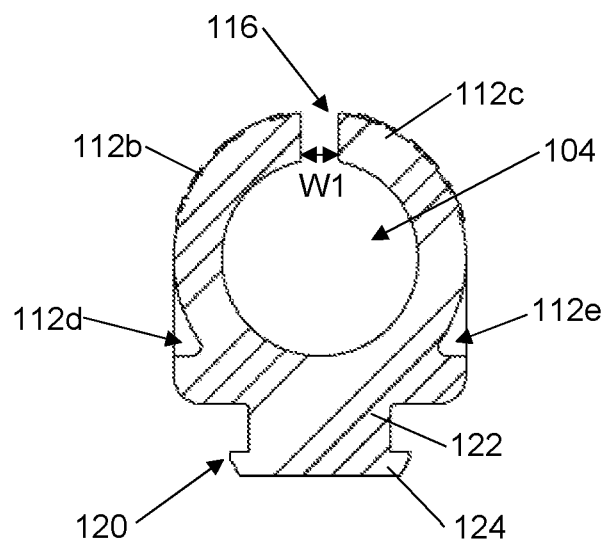
FIG. 3 illustrates a cross section of the hose positioner taken along line A-A.

Turning to FIG. 3, it can be seen that arced walls 112b, 112c of the middle arch portion 112 have recessed portions 112d, 112e that form an acute angle with the flat base 112a on each side of the elongate body 102. These recessed portions 112d, 112e are particularly useful when holding and gripping the hose positioner 100. When holding the hose positioner 100 and connecting two hose positioners together (which will be described below), the recessed portions 112d, 112e provide convenient locations for placement of a thumb and finger to hold the hose positioner in place while applying force to insert the connecting members into a connector.

Figure 4:
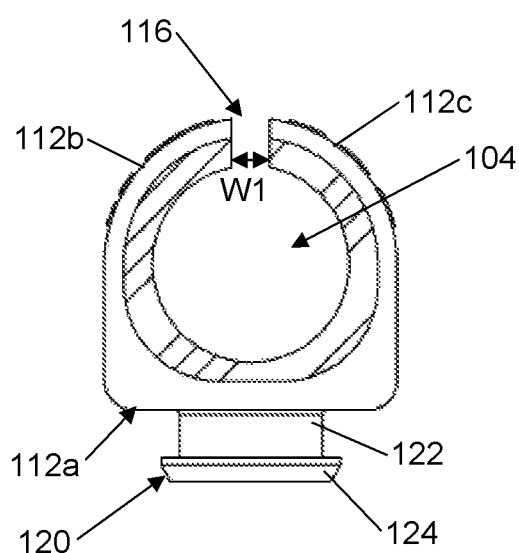
FIG. 4 illustrates a cross section of the hose positioner taken along line B-B.

As can be seen in FIGS. 1, 3 and 4, a longitudinal opening 116 is formed in the elongate body 102 and adjoins the cylindrical passageway 104. The longitudinal opening 116 divides the arching portion into the arced walls 108b, 108c, 110b, 110c, 112b, 112c of the arch portions 108, 110, 112 and defines two opposed faces 118a, 118b.

The longitudinal opening 116 allows the opposed faces 118a, 118b to be separated (by a person's hands or a suitable tool), thereby increasing the width W1 of the longitudinal opening 116 to allow a hose to be received within the passageway 104. The hose positioner 100 is made of a resilient material (such as plastic) that returns to its original position after the opposed faces 118a, 118b have been manipulated to thereby retain the hose within the passageway 104. In some preferred embodiments, the hose positioner 100 is made from polyurethane.

In use, each of the cutout regions defining the cylindrical portions 106a, 106b receives a releasable, and in some embodiments adjustable, fastener (such as zip ties 802, 902 shown in FIGS. 8 and 9, for example) for biasing the opposing faces 118a, 118b together to reduce the width of the longitudinal opening 116 or eliminate the longitudinal opening 116 entirely. Of course, the fastener may also be adjusted to maintain a minimum width or spacing between the opposing faces 118a, 118b to prevent the opening 116 from being widened and thereby a hose located within the passageway 104 from being removed.

The recessed cylindrical portions 106a, 106b are sufficiently recessed relative to the surrounding arch portions 108, 110, 112 to ensure that, when fastened, a fastener will not slip off the end of the hose positioner 100 over the end arch portions 108, 110. In this regard, the end arch portions 108, 110 are particularly useful.

Figure 2:
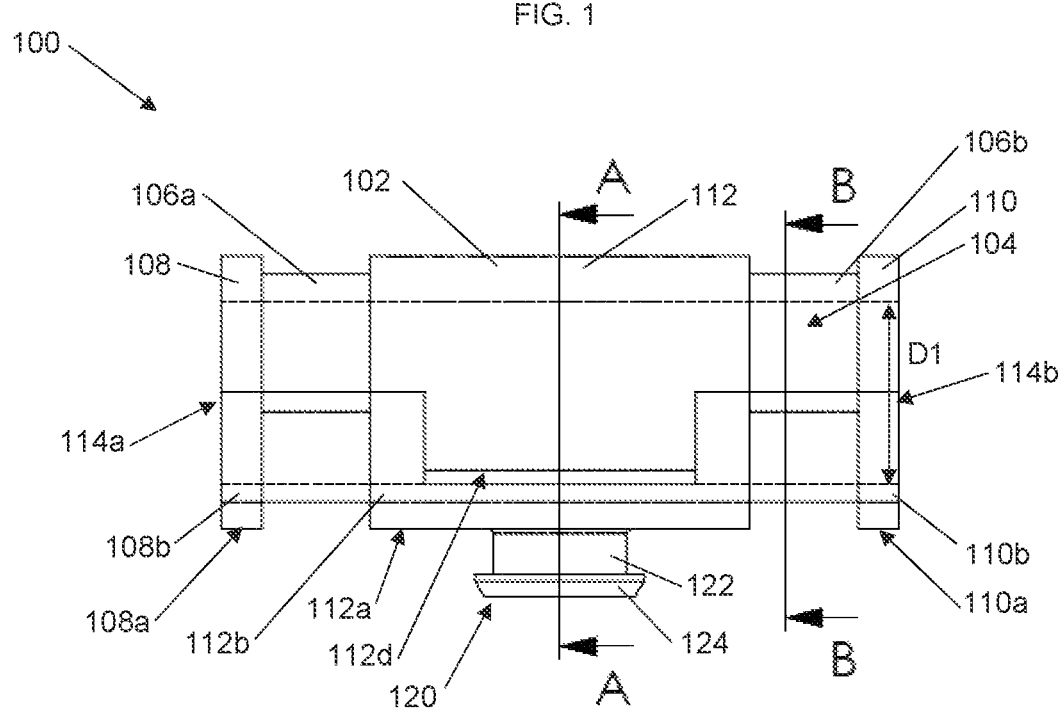
FIG. 2 illustrates a side view of the hose positioner shown in FIG. 1.
Figure 5:
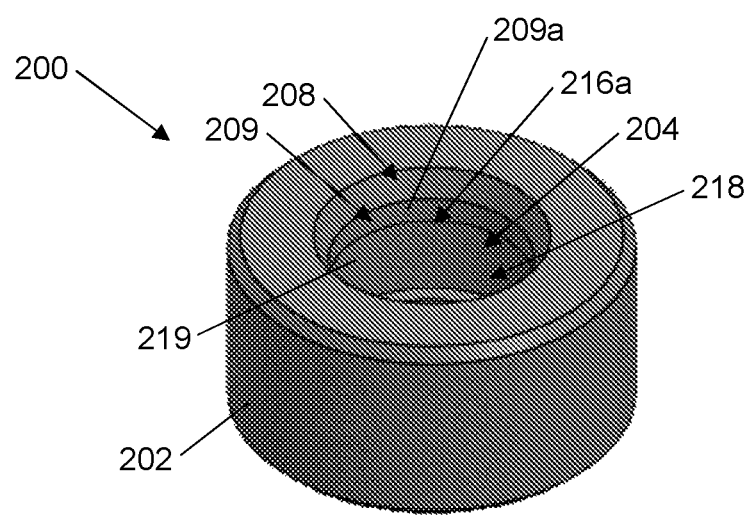
FIG. 5 illustrates a view of a connector for connecting two hose positioners in accordance with an embodiment of the present invention.
Figure 6:
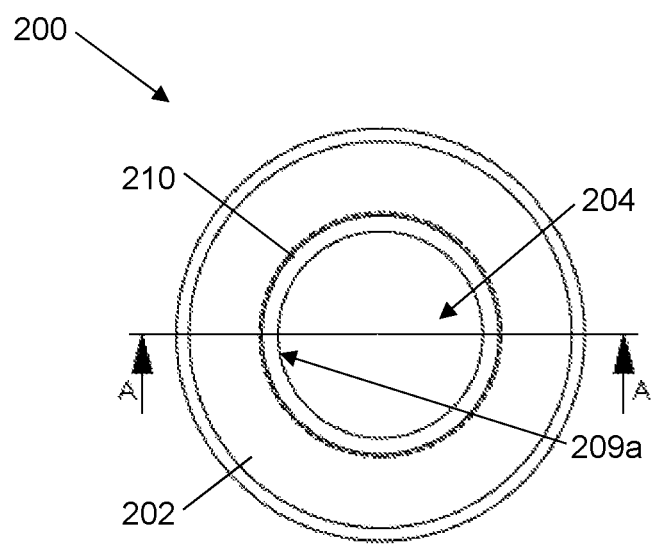
FIG. 6 illustrates an overhead view of the connector of FIG. 5.

Extending from the flat base 112a of the middle arch portion 112 is a connecting arrangement having a connecting member 120 for connecting the hose positioner 100 to a connecting boss 200 (which is shown FIG. 5 and will be described below). The connecting member 120 takes the form of a shaft and a head. Turning to FIG. 2, it can be seen that the shaft is in the form of a cylindrical portion 122 extending from the flat base 112a that terminates in the head portion in the form of a frustoconical portion 124 that is wider than the cylindrical portion 122 of the connecting member 120. The wider proportions of the frustoconical portion 124 of the connecting member 120 of the hose positioner 100 allows the connecting member 120 to be received in a complementary connector in an interference fit engagement, an example of which can be seen in FIG. 9 and will be explained in more detail below. Preferably, in some embodiments, the angled wall of the frustonical portion 124 is angled at approximately 60°.

As alluded to above, embodiments of the invention also provide a connector for connecting two or more hose positioners (such as two of hose positioner 100 described above) together. In one embodiment, shown in FIG. 5, the connector is in the form of a connecting boss 200.

The connecting boss 200 has a connecting arrangement that is shaped reciprocally to the connecting arrangement (specifically the frustoconical portion 124 and cylindrical portion 122) of the hose positioner 100. The connecting boss 200, and connectors in accordance with the invention more generally, are preferably formed from nylon.

The connecting boss 200 includes a cylindrical body 202 with a passageway 204 formed therethrough connected to two diametrically opposed frustoconical openings 208, 212 that adjoin cylindrical passageways 209, 213 (defined by walls 209a, 213a) that, in turn, adjoin a centrally located interior space 218 defined by interior wall 219.

The connecting arrangement is present in the form of frustoconical openings 208, 212 which are complementary to the shape of the frustoconical portions 124 of the connecting members 120 of the hose positioner 100. Each opening 208, 212 is adapted to receive and retain a connecting member 120 of a hose positioner 100 via an interference fit, as described above. More particularly, the connecting boss 200 includes lips 216a, 216b formed between the cylindrical passageway 209, 213 and the interior wall 219. In use, the lips 216a, 216b receive and retain the frustoconical portions 124 of the connecting members 120 of the hose positioners 100.

Figure 7:
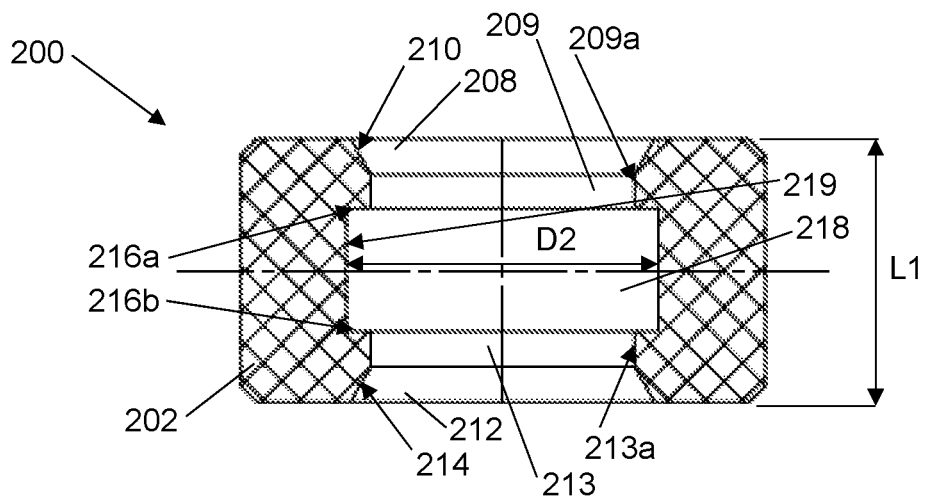
FIG. 7 illustrates a cross-section of the connector taken along line A-A.

With reference to FIG. 7, it can be more clearly seen that each opening 208, 212 is defined by a chamfered or inwardly angled face 210, 214, respectively, that is complementary to the frustoconical portion 124 of the connecting member 120 of the hose positioner 100 such that the angled face 210, 214 acts as a guide leading to an interior space 218 within the connecting boss 200. The inwardly angled faces 210, 214 are angled reciprocally to the frustoconical portion 124 preferably at an angle of approximately 60°.

The interior space 218 has a diameter D2 that is greater than the openings 208, 212 of the connecting boss 200 to thereby form the lips 216a, 216b that sit beneath and thus retain the frustoconical portion 124 of the connecting member 120 within the interior space 218 of the connecting boss 200 when the connecting member 120 is within the connecting boss 200. An example of the frustoconical portions 124 retained in the connecting boss 200 can be seen in FIG. 10.

The length L1 of the cylindrical body of the connecting boss 200 can be any length suitable for spacing two hose positioners (such as hose positioner 100, for example) apart. An example of this arrangement can be seen in FIGS. 8 and 9.

Embodiments of the invention can also provide a modular assembly that allows multiple hose positioners, of varying or similar sizes, to be connected using the connector.

Figure 8:
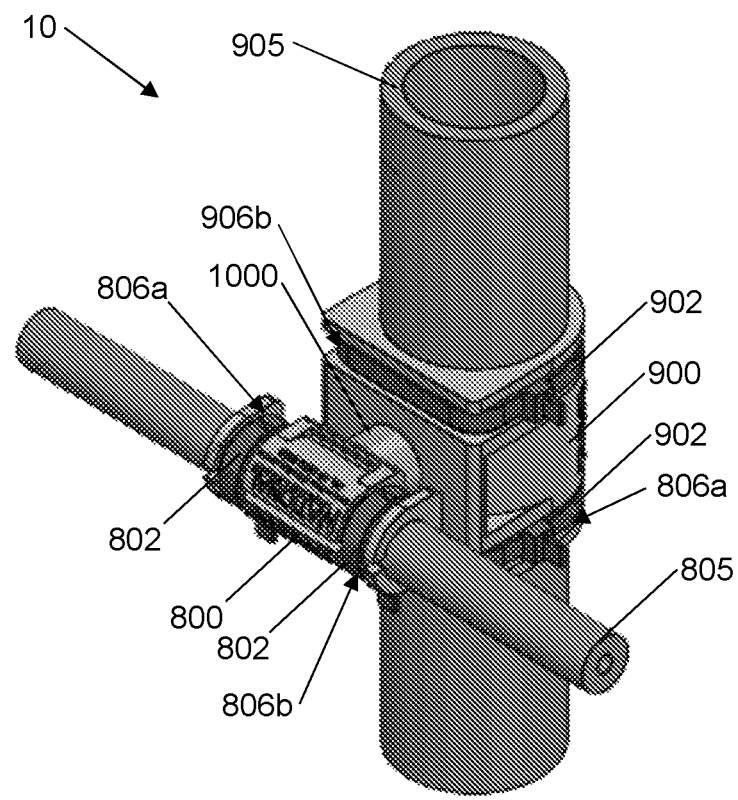
FIG. 8 illustrates a hose positioner assembly according to an embodiment of the present invention.
Figure 9:
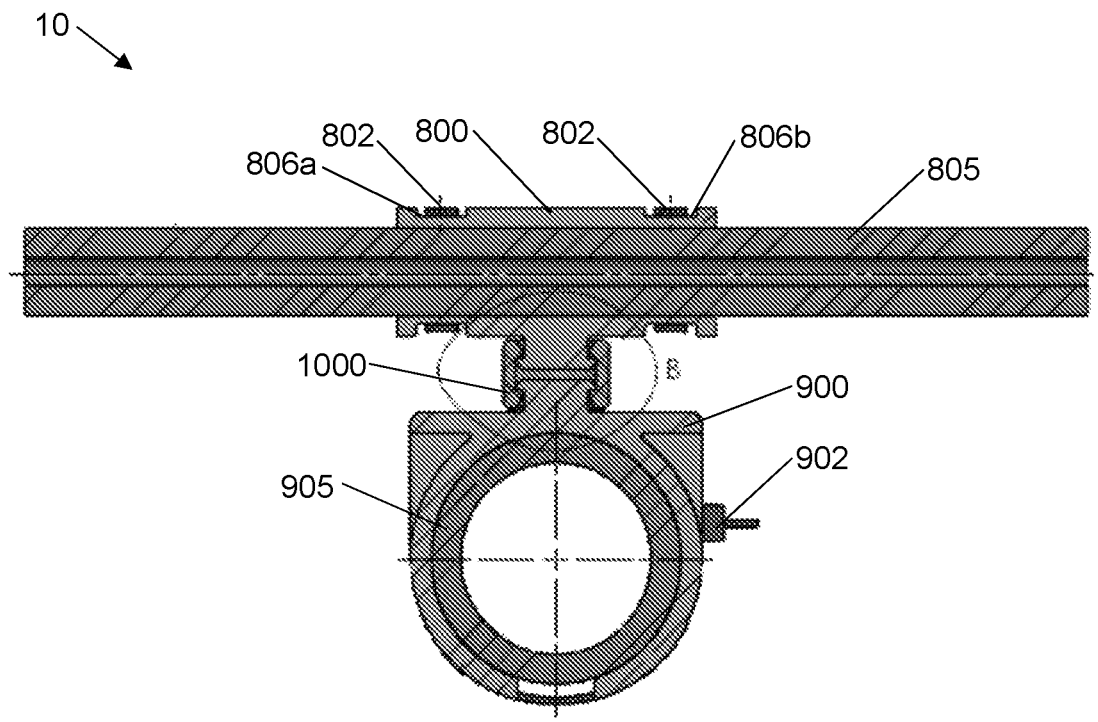
FIG. 9 illustrates a cross section of the hose positioner assembly taken along the centre of the two hose positioners.
Figure 10:
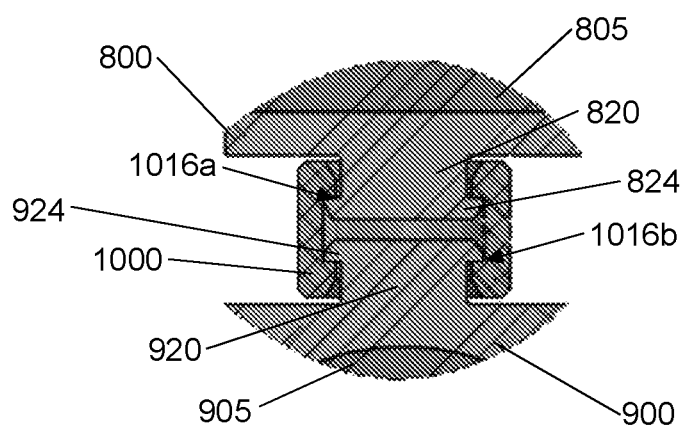
FIG. 10 illustrates a detail of the connecting member connecting the two hose positioners.

An example of the abovementioned modular assembly can be seen in FIGS. 8-10 in the form of assembly 10 where two hose positioners 800, 900 are retained in place by a connector 1000 and are kept in a spaced apart arrangement or relationship to prevent contact between the two hoses 805, 905 retained within the hose positioners 800, 900. Importantly, the fixed, spaced apart relationship provided by the combination of the clamps and the connector prevents or at least limits the contact of the hoses to reduce and/or prevent rubbing and wear of the hoses as they move during use.

The hose positioners 800, 900 are substantially similar to hose positioner 100 described above having the same features but being of different sizes. Similar numbering has been used to refer to similar features that are present in hose positioner 100, and hose positioners 800, 900. For example, where 1xx refers to a feature in relation to hose positioner 100, 8xx or 9xx will be used to refer to the same or similar feature in hose positioner 800 and hose positioner 900, respectively, unless otherwise stated or made clear. Similarly, connector 1000 is substantially similar to boss 200 described above.

Each of the hose positioners 800, 900 are secured by pairs of zip ties 802, 902, respectively, about the recessed portions.

When fitted together, the hose positioners 800, 900 and connector 1000 are freely rotatable due to the frustoconical portion 824, 924 of the connecting members 820, 920 being seated against, but not fastened to, the interior lip 1016a, 1016b or seat of the connector 1000, which can be best seen in FIG. 10. This seating arrangement also reduces the likelihood of the hose positioners 800, 900 being uncoupled from the connector 1000. This rotation allows the hoses 805, 905 to be repositioned, if necessary or as desired. Furthermore, as the hoses 805, 905 move during use and operation of machinery and equipment (in hydraulic applications, for example), the hose positioners 800, 900 can freely move in relation to one another. For example, while hose positioners 800 and hose positioner 900 (and thus hoses 805, 905) are arranged perpendicular to each other, if needed, hose positioner 800 could be rotated 90° so that the hoses 805, 905 extend parallel relative to one another.

In use, the assembly 10 is formed by locating each hose 805, 905 within its respective (and suitably sized) hose positioner 800, 900. The connector 1000 is then pushed onto the connecting member of one of the hose positioners (connecting member 820 of hose positioner 800, for example) until the connecting member 820 of hose positioner 800 is retained within the connector 1000. The combined connector 1000 and hose positioner 800 are then connected to hose positioner 900 by pushing the open end of connector 1000 onto the connecting member 920 of hose positioner 900 until the connecting member 920 of hose positioner 900 is retained within the connector 1000 (as shown in FIG. 9).

Figure 11:
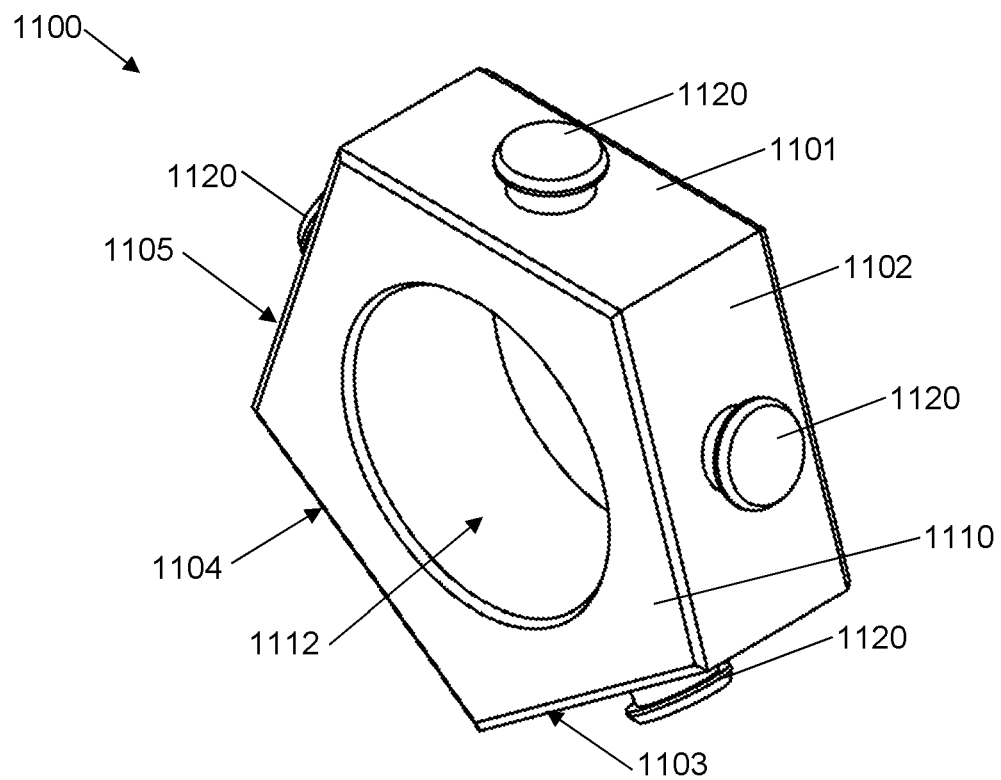
FIG. 11 illustrates a five sided connector for connecting up to five hose positioners in a spaced apart relationship in accordance with an embodiment of the present invention.
Figure 12:
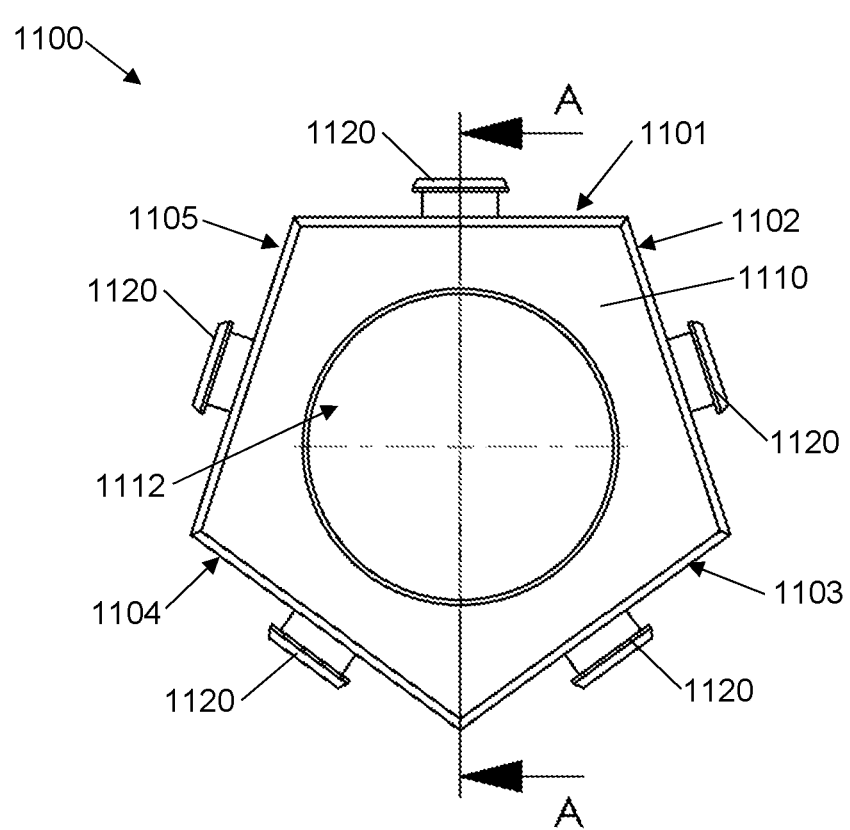
FIG. 12 illustrates a front view of the five sided connector of FIG. 11.
Figure 13:
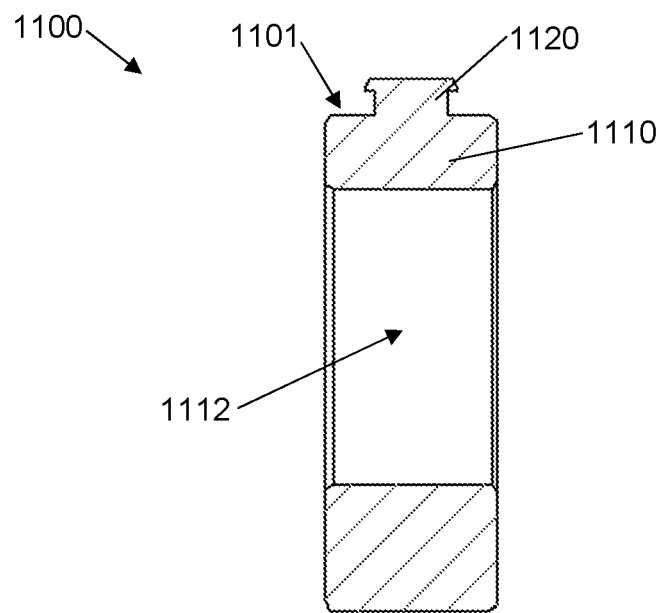
FIG. 13 illustrates a cross-section of the five sided connector taken along line A-A.

With reference to FIG. 11, a multi-sided spacer can also be provided in the form of a pentagonal spacer 1100 having a body 1110 in the form of a pentagonal prism and a connecting member 1120 extending perpendicularly from each face 1101-1105 of the spacer 1100. The body 1110 has a passageway 1112 extending therethrough. This passageway 1112 reduces the amount of material required to form the pentagonal spacer 1100 and thus reduces the weight of the pentagonal spacer 1100. The passageway 1112 also provides a means for the pentagonal spacer 1100 to be mounted to another object.

Figure 14:
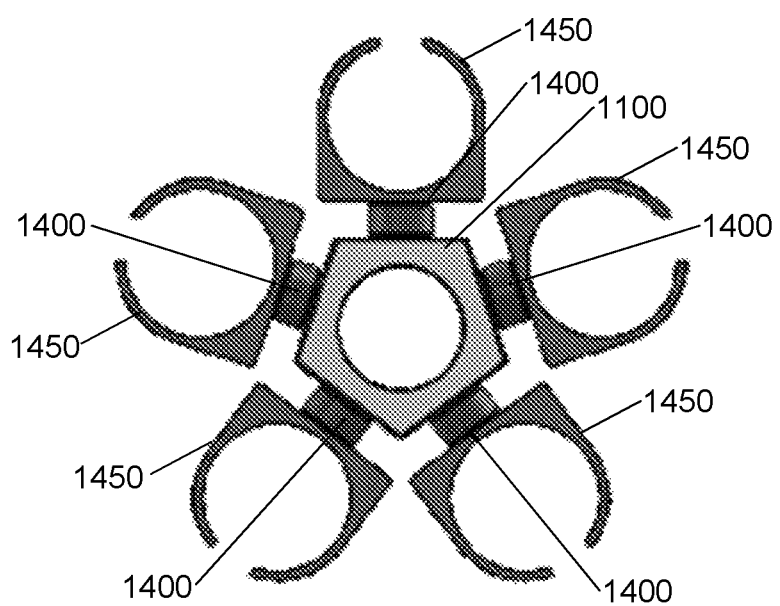
FIG. 14 illustrates the five sided connector of FIG. 11 in use with five hose positioners and five connectors.

As shown in FIG. 14, each connecting member 1120 can receive a connector 1400 (as described above in relation to connecting boss 200) having a hose positioner 1450 attached thereto. Connecting member 1120 is substantially similar to connecting boss 200 and has the same features and structure.

These connecting members 1120 allow a plurality of hoses to be retained and evenly spaced relative to one another. Of course, in the present example there can be a total of five hoses spaced apart by 72°. The multi-sided spacer could be any shape, such as triangular, square, rectangular, hexagonal or octagonal, for example, to accommodate as many or as few hoses as required.

Figure 15:
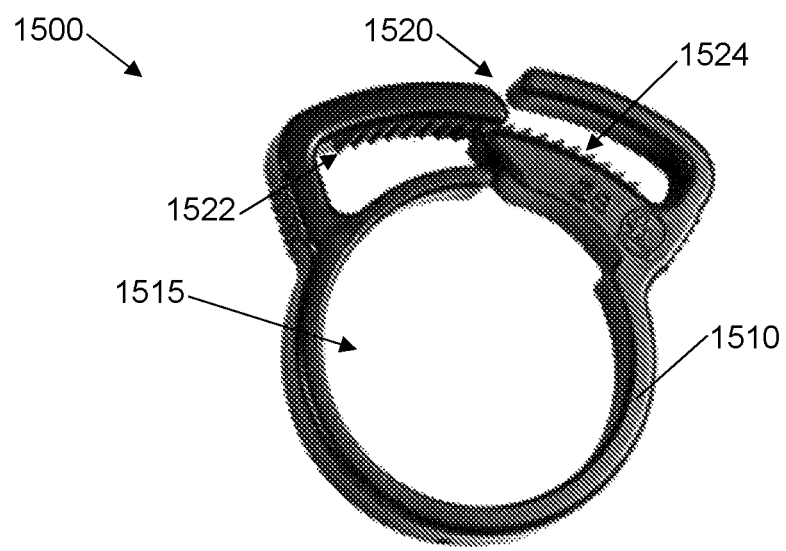
FIG. 15 illustrates a connector according to another embodiment of the present invention.

In some further embodiments, the connector has a flexible or adjustable outer wall surrounding a passageway that receives the connecting members of the hose positioners (connecting member 120 of hose positioner 100, for example). The adjustable outer wall allows the circumference of the connector to be varied to facilitate easier connection of two or more hose positioners to the connector. In one embodiment, an example of which is shown in FIG. 15, the cylindrical outer wall 1510 of connector 1500 surrounding the passageway 1515 may be substantially cylindrical (similar to connecting boss 200) having a separable joining arrangement 1520. That is, the outer wall 1510 may be joined and unjoined by a suitable mechanism, such as by two opposed faces having reciprocal teeth 1522, 1524 that interlock when forced into a joined configuration. The connector 1500 shown can also be configured to incorporate the retaining and seating arrangement shown and described above in relation to connecting boss 200.

This particular embodiment allows an installer to more easily join two hose positioners together or de-couple two hose positioners if maintenance or replacement of any component is required.

Figure 16:
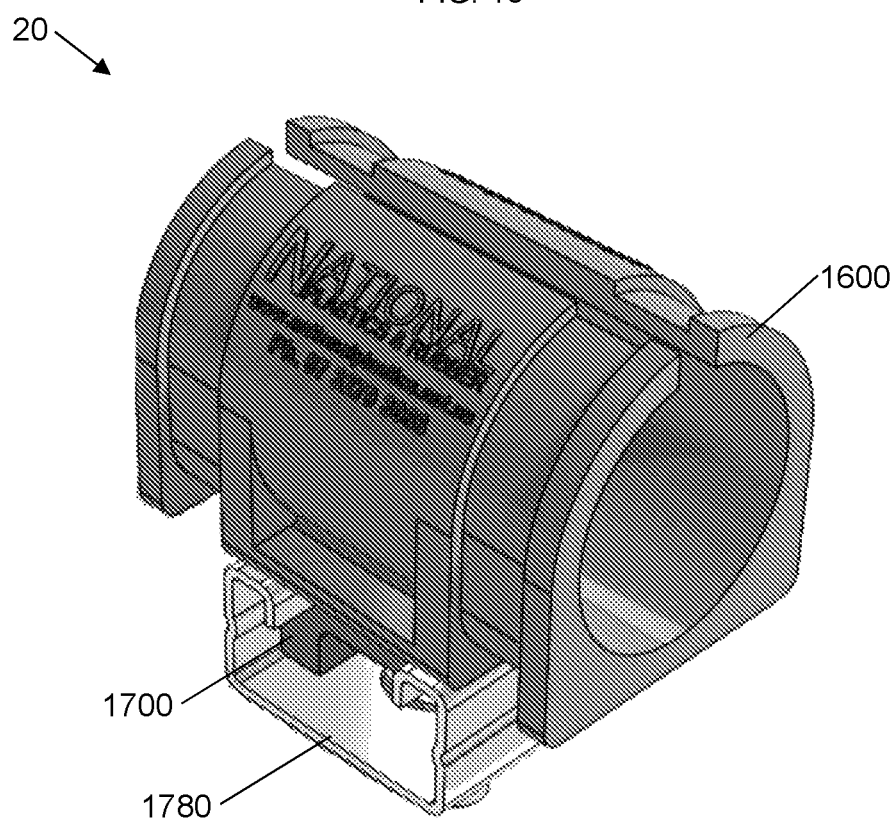
FIG. 16 illustrates a perspective view of a hose positioner assembly having a single hose positioner connected to a connector and a C purlin.
Figure 17:
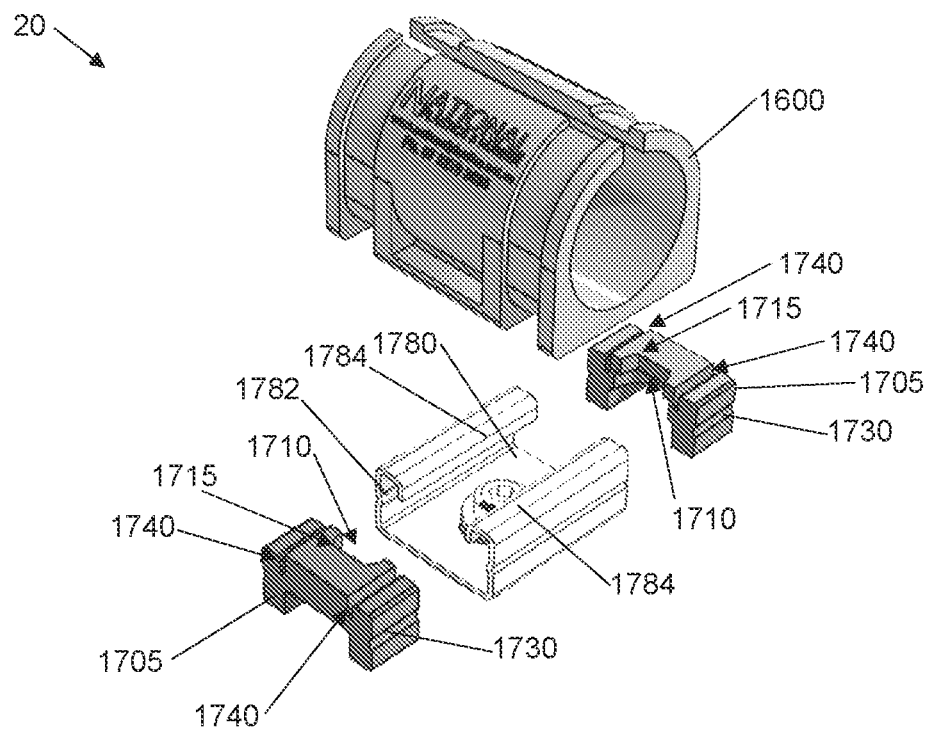
FIG. 17 illustrates an elevated, exploded view of the hose positioner assembly of FIG. 16.
Figure 18:
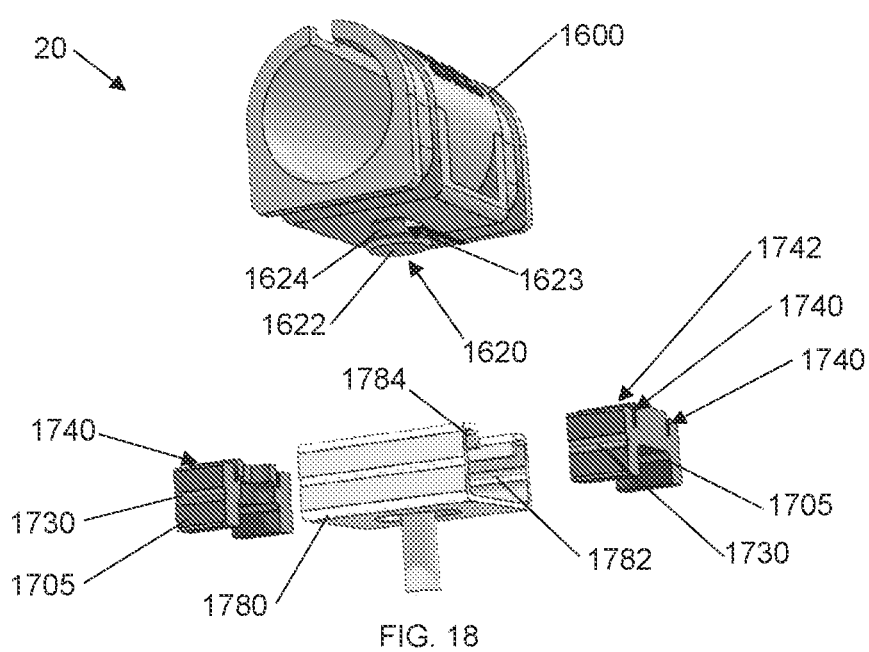
FIG. 18 illustrates another exploded view of the hose positioner assembly of FIG. 16.

In another embodiment, there is provided an assembly 20 as shown in FIGS. 16-18. The assembly 20 includes a hose positioner 1600 and a connector 1700.

The hose positioner 1600 is substantially similar to hose positioner 100 described above. The difference in hose positioner 1600, when compared to hose positioner 100, resides in the shape of the connecting member 1620. Connecting member 1620 has a shaft in the form of a truncated cylindrical portion 1622 and a head in the form of a frustoconical portion 1624 (similar to frustoconical portion 124 of hose positioner 100). The truncated cylindrical portion may be better understood as a cylinder having two segments removed on opposing sides or a cube or rectangular prism having two opposing slightly rounded sides.

Turning to connector 1700, shown in FIGS. 17 and 18, it can be seen that there are two identical halves 1705. The connector 1700, as with the connecting boss 200 described above, has a connecting arrangement that is shaped reciprocally to the connecting member 1620 of the hose positioner 1600.

Each half 1705 of the connector 1700 defines a portion of the connecting arrangement that is reciprocally shaped to receive the connecting member 1620. More specifically, each half 1705 defines an opening 1710 in the form of half of a truncated circle (e.g. a circle with two segments removed at opposing sides) or square with two opposing, slightly rounded sides. When fully assembled, the connector has an opening 1710 in the shape of a full truncated circle. It will be understood that, in some embodiments, the connector 1700 could be formed as a single piece. In this regard, the opening of a connector in embodiments of the invention could be any shape, including circular or cylindrical as shown in boss 200, or having two or more sides (i.e not circular or cylindrical) to prevent rotation of the hose positioners when connected with an appropriate connector.

When the connecting member 1620 of the hose positioner 1600 is received within the connector 1700, the corners 1715 of the opening 1710 of the connector 1700 are congruent or interlocking with the corners 1623 of the truncated cylinder portion 1622 to thereby prevent rotation of the hose positioner 1600 relative to the connector 1700.

Connector 1700 is also adapted to connect to and space a single hose positioner (such as hose positioner 1600, for example), rather than two hose positioners as boss 200 does.

In the illustrated embodiment, connector 1700 is used with a C purlin 1780, where the connector 1700 has channels 1730 located on opposite sides of the connector 1700 which are reciprocal with ridges 1782 of the C purlin 1780. In addition, connector 1700 has two parallel channels 1740 located on an upper side 1742 of the connector 1700 which abuts the hose positioner 1600. The two parallel channels 1740 receive the rolled edges 1784 of the C purlin 1700. The C purlin 1780 may also be referred to as a C-channel having rolled edges.

In some additional embodiments, the connector may be T-shaped or +− shaped to allow the connection and spacing of three or four hose positioners, respectively.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step, etc.

The above detailed description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

Throughout the specification and claims (if present), unless the context requires otherwise, the term "substantially" or "about" will be understood to not be limited to the specific value or range qualified by the terms.

The invention claimed is:

1. A hose positioner comprising:
   a resilient body having a passageway therethrough and a longitudinal opening defined by two opposing walls of the body, the body adapted to receive a hose into the passageway through the longitudinal opening by applying force to urge the two opposing walls apart, wherein the two opposing walls of the resilient body return to an original position after the force is removed, wherein the body comprises one or more recessed regions extending laterally around a perimeter of the body adapted to receive a fastener; and
   a connecting arrangement having a connecting member extending from the body, the connecting member adapted to be releasably retained by a connector for retaining the hose positioner in a spaced apart relationship from an object connected to the connector, wherein the two opposing walls of the body defining the opening have a distance between each other in the original position, and wherein, in use, the fastener at least maintains the two opposing walls in a spaced apart relationship having a minimum width therebetween.

2. The hose positioner according to claim 1, wherein the connecting arrangement is adapted to be releasably retained within the connector for receiving and retaining two or more hose positioners in a spaced apart relationship.

3. The hose positioner according to claim 1, wherein the object connected to the connector is a mounting structure or support structure connected on an opposite side of the connector to the hose positioner.

4. The hose positioner according to claim 1, wherein the body is an elongate body.

5. The hose positioner according to claim 4, wherein the elongate body is substantially arch-shaped.

6. The hose positioner according to claim 5, wherein the arch-shaped elongate body comprises a flat base and an arch portion extending from one end of the flat base to a diametrically opposed end of the flat base.

7. The hose positioner according to claim 1, wherein the passageway is substantially cylindrical.

8. The hose positioner according to claim 4, wherein the passageway is an open-ended passageway extending longitudinally through the elongate body.

9. The hose positioner according to claim 1, wherein the connecting member comprises a shaft and a head.

10. The hose positioner according to claim 9, wherein the shaft comprises a cylindrical portion and the head comprises a frustoconical portion.

11. The hose positioner according to claim 10, wherein an end of the cylindrical portion is attached to the body of the hose positioner.

12. The hose positioner according to claim 11, wherein an opposing end of the cylindrical portion is attached to the frustoconical portion.

13. The hose positioner according to claim 10, wherein a diameter of a base of the frustoconical portion is greater than a diameter of the cylindrical portion.

14. The hose positioner according to claim 9, wherein the shaft of the connecting member comprises a rectangular portion, a square portion, a half cylinder portion or a truncated circle portion.

15. The hose positioner according to claim 1, wherein the opening in the body and the passageway are connected.

16. The hose positioner according to claim 1, wherein the elongate body comprises at least two recessed regions.

17. The hose positioner according to claim 1, wherein, in use, the fastener is adjusted to bias the two walls together or towards each other thereby reducing a width of the opening extending along the elongate body.

18. A method for retaining a hose, the method comprising:
locating a hose in a hose positioner having a resilient body having a passageway therethrough and a longitudinal opening defined by two opposing walls, the body adapted to receive the hose into the passageway through the longitudinal opening by applying force to urge the two opposing walls apart, wherein the two opposing walls of the resilient body return to an original position after the force is removed, wherein the two opposing walls of the body defining the opening have a distance between each other in the original position, wherein the body comprises one or more recessed regions extending laterally around a perimeter of the body adapted to receive a fastener, wherein, in use, the fastener at least maintains the two opposing walls in a spaced apart relationship having a minimum width therebetween, the hose positioner having a connecting arrangement having a connecting member extending from the body, the connecting member adapted to be releasably retained by a connector for retaining the hose positioner in a spaced apart relationship from an object connected to the connector; and connecting the hose positioner to the connector, the connector having the connecting arrangement reciprocal to the connecting arrangement of the hose positioner, wherein the connector holds the hose positioner in a spaced apart relationship relative to the connector.

* * * * *